Patented Mar. 20, 1945

2,371,757

UNITED STATES PATENT OFFICE 2,371,757

FLUOROACETIC ACIDS

Albert L. Henne, Columbus, Ohio, assignor to E. I. du Pont de Nemours & Company, Wilmington, Del., a corporation of Delaware No Drawing. Application May 19, 1943, Serial No. 487,615

8 Claims. (Cl. 260—539)

A. This invention relates to fluoroacetic acids and to a process of producing them.

B. Swarts, in the latter part of the nineteenth century, prepared certain fluoroacetic acids, the preparation of which is described in "Memoirs ... par. l'Academie Royale ... Belgique." Other investigators have surveyed this field but until recently the best available process for the preparation of trifluoroacetic acid was the acid oxidation of meta-amino-benzotrifluoride, a process which is long, costly, and gives but small yields of the acid.

C. It is an object of this invention to make fluoroacetic acids, particularly di- and trifluoroacetic acids, by a process which is technically and economically satisfactory.

D. These objects are accomplished, generally speaking, by reacting compounds of the type $CF_2XCY=CYZ$, in which Y and Z are hydrogen or halogen, and X is hydrogen, fluorine or chlorine, with an alkali metal permanganate in alkaline medium, preferably potassium permanganate in aqueous solution made alkaline by sodium hydroxide.

E. In the practice of the invention intermediates corresponding to the formula above are used. The prime requirement of the compound is that it shall contain the grouping $-CF_2CY=CYZ$, Y and Z being hydrogen or halogen. Specific examples of compounds containing this group will be found hereinafter in this specification.

F. In carrying out the reaction the temperature of the reaction mass is raised enough to produce an efficient reaction without carrying off the reactants or inducing excessive side reactions. In general, I have found temperatures of the order of 70°–80° C. to be quite satisfactory. Temperatures from 20°–130° have been employed with particular reactants. At temperatures above 100°, pressure vessels can be used and the permanganate and caustic can be added simultaneously and slowly to the higher boiling organic starting materials.

G. The reaction, in general, may be carried out at atmospheric pressure, although other pressures, either higher or lower, may be used where efficiency is served.

H. When the reaction has been completed, excess caustic can be neutralized with acid, such as hydrochloric acid. If, after the reaction has been completed, there is an excess of potassium permanganate, it can be removed by reaction with sulfur dioxide or bisulfite. In working up the oxidation mass the alkali salt of the organic acid can be isolated by clarification, to rid it of $MnO_2$, and evaporation to dryness. Alternatively, the oxidation mass can be acidified, the aqueous organic acid may be distilled off, neutralized with sodium carbonate, dried as the sodium salt, mixed with the theoretical amount or an excess of 93-100% sulfuric acid, and the organic acid distilled off.

I. Present observations seem to indicate that a combined hydrolysis and oxidation occurs, according to a net reaction which may be expressed as follows when $CF_3CCl=CCl_2$ is the intermediate:

$3CF_3CCl=CCl_2+4KMnO_4+8KOH \rightarrow$
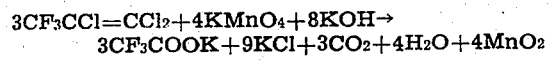
$3CF_3COOK+9KCl+3CO_2+4H_2O+4MnO_2$ The trifluoro acetic acid is formed from the potassium salt by reaction with acid. Extraction of the acid is accomplished by solvents, such as ethyl alcohol or ethers. Any solvent which is inert to the ingredients of the reaction mass and which dissolves the prime product may be used in this step of the process. This extraction dissolves out the desired products and leaves behind the undesired ones, such as the halide salts. Examples of satisfactory solvents are ethyl alcohol, isopropyl alcohol, secondary butyl alcohol and diethyl ether. These do not constitute a limitation of species or genus since the requirements for a solvent are simply that it shall dissolve one part of the mixture from the other.

J. The following examples illustrate the invention but are not intended to be a limitation thereof.

Example I 100 parts of $CF_3CCl=CCl_2$ (Henne and Whaley, JACS 64, 1158) were charged to a flask fitted with a separatory funnel, a stirrer, a reflux condenser and a thermometer, 200 parts of water were added forming a layer above the intermediate. 140 parts of potassium permanganate were added with enough sodium hydroxide to maintain slight alkalinity at all times. The mixture was heated with agitation to 80° C. for a period of 40 hours. When the oxidation was complete, the charge was made neutral by the addition of a small quantity of HCl. The clear liquid, which contained the sodium and potassium salts of trifluoro acetic acid in aqueous solution, was decanted off. The mixture was filtered and washed with warm water, the filtrate and wash liquor being combined with the decanted liquor and evaporated to dryness. The sodium and potassium salts of trifluoro acetic acid were extracted from the mixed solids resulting from the evaporation to dryness by dissolving them in ethyl alcohol and filtering. The alcohol was removed from the filtrate by distillation and the dry salt of trifluoro acetic acid was treated with sulfuric acid. The free trifluoro acetic acid was then distilled off. A yield of 75% of theory was obtained.

Example II

If 1,1,2,3-tetrachloro-3,3-difluoropropene-1 is substituted for the 1,1,2-trichloro-3,3,3-trifluoropropene-1 which was used in Example 1 and the reaction is otherwise carried out similarly, monochloro-difluoro acetic acid is obtained.

Example III 1 part of $CF_3CH=CH_2$ (Henne & Whaley, J. A. C. S. 64, 1158), 2.5 parts of potassium permanganate, 2.0 parts of potassium hydroxide, and 3.0 parts of water were sealed in a glass tube. The tube was agitated for two days at 25–30° C. The tube was opened and the contents extracted with water to separate soluble salts from manganese dioxide. The resulting solution was then neutralized with dilute HCl, dried on the steam bath and the cake extracted with absolute alcohol to separate the salt of trifluoro acetic acid from the inorganic salts present. The alcohol extract was evaporated to dryness, the cake treated with the calculated amount of sulfuric acid and the liberated trifluoro acetic acid distilled off.

Example IV 295 parts of 1,2-dichloro-3,3-difluoropropene ($CHF_2CCl=CHCl$), prepared by treatment of the tetrachloropropene of H. J. Prins (Rec. Trav. Chim. 51, 1065–1080; Dissertation Delft, 1912, and J. Pr. Chemie 89, 414–451) with antimony trifluoride) were added to an agitated solution of 670 parts of potassium permanganate and 250 parts of sodium hydroxide in three liters of water, at such a rate that the temperature rose to 70° C. and was maintained at 68–70° by using a cool water bath and controlling the rate of addition of difluoride. After about three hours at 68–70°, the reaction was virtually complete and the mass was allowed to agitate until the temperature dropped to 45°, then was heated to 85° until no more refluxing was observed. The oxidation mass was then cooled, excess of permanganate destroyed by sulfur dioxide, and the mass slowly acidified by sulfuric acid (220 parts). Sulfur dioxide was then passed in with external cooling until the manganese dioxide dissolved. A further 184 parts of concentrated sulfuric acid were carefully added, the mass cooled, and difluoro acetic acid extracted by continuous extraction for 30–40 hours with diethyl ether. Distillation of the solvent and product through an 18-inch Vigreaux column gave difluoro acetic acid in 85% (theory) yield. The product (difluoro acetic acid) was a clear colorless sharp-smelling liquid which fumes in moist air.

K. An advantage of the invention is in providing technically feasible methods for preparing di- and trifluoro acetic acids. Other methods are in comparison technically undesirable and too expensive.

L. As many apparently widely different embodiments of this invention may be made without departing from the spirit and scope thereof, it is to be understood that I do not limit myself to the specific embodiments thereof except as defined in the appended claims.

I claim:

1. The process of preparing trifluoro acetic acid which comprises reacting $CF_3CCl=CCl_2$ with permanganate in aqueous alkaline medium at about 80° C., neutralizing, removing the solution from the solids, evaporating the solution to dryness, extracting the dried residue with alcohol, separating the extract from the alcohol, reacting it with sulfuric acid, and separating trifluoro acetic acid by distillation.

2. The process of preparing difluoro acetic acid which comprises reacting $CHF_2CCl=CHCl$ with a permanganate in aqueous alkaline medium at about 70° C., destroying excess permanganate by reaction with $SO_2$, neutralizing the mass and reacting the prime product with sulfuric acid, extracting the prime product from the mass with diethyl ether, and removing the extract by distillation.

3. The process of preparing a fluoro acetic acid which comprises reacting a compound represented by the formula $CF_2XCY=CYZ$ (in which each of Z, Y and X is one of a group consisting of hydrogen, fluorine, and chlorine) with a permanganate in an aqueous solution of caustic alkali at a temperature of from about 70° C. to about 80° C., neutralizing the reaction mass and reacting it with mineral acid, extracting the prime product with a solvent, and isolating the prime product from the solvent.

4. The process of preparing a fluoro acetic acid which comprises reacting a compound represented by the formula $CF_2XCY=CYZ$ (in which each of Z, Y and X is one of a group consisting of hydrogen, fluorine, and chlorine) with an alkali metal permanganate in an aqueous solution of caustic alkali at a temperature of from about 70° C. to about 80° C., and recovering the fluoro acetic acid from the reaction mass.

5. The process of preparing a fluoro acetic acid which comprises reacting a compound represented by the formula $CF_2XCY=CYZ$ (in which each of Z, Y and X is one of a group consisting of hydrogen, fluorine, and chlorine) with a permanganate in an aqueous alkaline medium at a temperature of from about 25° C. to about 80° C. and isolating the fluoro acetic acid.

6. The process of preparing a fluoro acetic acid which comprises reacting a compound represented by the formula $CF_2XCY=CYZ$ (in which each of Z, Y and X is one of a group consisting of hydrogen, fluorine, and chlorine) with a permanganate in an aqueous alkaline medium at a temperature of from about 25° C. to about 80° C., neutralizing the reaction mass and reacting it with mineral acid and isolating the fluoro acetic acid.

7. The process of preparing trifluoro acetic acid which comprises reacting $CF_3CCl=CCl_2$ with an alkali metal permanganate in an aqueous solution of caustic alkali at about 80° C. and recovering the trifluoro acetic acid from the reaction mass.

8. The process of preparing difluoro acetic acid which comprises reacting $CHF_2CCl=CHCl$ with an alkali metal permanganate in an aqueous solution of caustic alkali at about 70° C. and recovering the difluoro acetic acid from the reaction mass.

ALBERT L. HENNE.